United States Patent
Sato et al.

(10) Patent No.: US 10,998,543 B2
(45) Date of Patent: May 4, 2021

(54) ROLL ELECTRODE AND METHOD FOR MANUFACTURING ROLL ELECTRODE

(71) Applicant: Nissan Motor Co., Ltd., Yokohama (JP)

(72) Inventors: Masanobu Sato, Kanagawa (JP); Tsuyoshi Kudo, Kanagawa (JP); Ikuma Matsuzaki, Kanagawa (JP); Yusuke Sasaki, Kanagawa (JP); Kazuki Miyatake, Kanagawa (JP); Kenta Uwai, Kanagawa (JP); Yuta Sadakata, Kanagawa (JP); Shigeo Komatsu, Kanagawa (JP); Fumihiro Miki, Kanagawa (JP)

(73) Assignee: Envision AESC Japan Ltd., Zama (JP)

( * ) Notice: Subject to any disclaimer, the term of this patent is extended or adjusted under 35 U.S.C. 154(b) by 194 days.

(21) Appl. No.: 16/172,982

(22) Filed: Oct. 29, 2018

(65) Prior Publication Data
US 2019/0067683 A1    Feb. 28, 2019

Related U.S. Application Data

(62) Division of application No. 15/744,093, filed as application No. PCT/JP2015/070333 on Jul. 15, 2015, now Pat. No. 10,529,981.

(51) Int. Cl.
*H01M 4/1393* (2010.01)
*H01M 4/13* (2010.01)
(Continued)

(52) U.S. Cl.
CPC ............ *H01M 4/1393* (2013.01); *H01M 4/13* (2013.01); *H01M 4/139* (2013.01);
(Continued)

(58) Field of Classification Search
CPC ........ H01M 4/1393; H01M 4/139; H01M 4/70; H01M 4/75; H01M 10/031; H01M 10/049; H01M 10/0587; H01M 10/0431
See application file for complete search history.

(56) References Cited

U.S. PATENT DOCUMENTS

| | | |
|---|---|---|
| 2005/0058889 A1 | 3/2005 | Goishihara |
| 2005/0123824 A1 | 6/2005 | Ishikawa et al. |

(Continued)

FOREIGN PATENT DOCUMENTS

| | | |
|---|---|---|
| CN | 204271207 U | 4/2015 |
| JP | 9-63565 A | 3/1997 |

(Continued)

*Primary Examiner* — Ula C Ruddock
*Assistant Examiner* — Thomas N. Parsons
(74) *Attorney, Agent, or Firm* — Global IP Counselors, LLP

(57) ABSTRACT

A roll electrode is provided with a core, an electrode, a fixing part and a regulating part. The core extends in an axial direction and has a substantially circular outer circumference. The electrode has an expansion coefficient lower than that of the core. The electrode wound into a roll shape on the outer circumference of the core. The fixing part is fixed to an end portion from which the electrode starts being wound around the core. The regulating part regulates the axial movement of the electrode wound into the roll shape with respect to the core.

5 Claims, 9 Drawing Sheets

(51) Int. Cl.
   *H01M 4/139*    (2010.01)
   *H01M 10/04*    (2006.01)
   *H01M 10/052*   (2010.01)
   *H01M 10/0587*  (2010.01)
   *H01M 4/1395*   (2010.01)
   *H01M 4/66*     (2006.01)
   *H01M 4/70*     (2006.01)
   *H01M 4/02*     (2006.01)

(52) U.S. Cl.
   CPC ......... *H01M 4/1395* (2013.01); *H01M 4/661* (2013.01); *H01M 4/70* (2013.01); *H01M 10/0431* (2013.01); *H01M 10/052* (2013.01); *H01M 10/0587* (2013.01); *H01M 2004/027* (2013.01); *H01M 2004/028* (2013.01)

(56) References Cited

U.S. PATENT DOCUMENTS

2007/0007672 A1* 1/2007 Goishihara ........... B32B 27/281
                                                    257/790
2010/0227209 A1 9/2010 Kim
2013/0224546 A1 8/2013 Hama et al.

FOREIGN PATENT DOCUMENTS

| | | |
|---|---|---|
| JP | 11-139486 A | 5/1999 |
| JP | 2002-284281 A | 10/2002 |
| JP | 2005-67722 A | 3/2005 |
| JP | 2006-44838 A | 2/2006 |
| JP | 2007-253422 A | 10/2007 |
| JP | 2007-254824 A | 10/2007 |
| JP | 2007253422 | * 10/2007 |
| JP | 2011-18637 A | 1/2011 |
| JP | 2011216382 | * 10/2011 |
| JP | 2011216382 A | * 10/2011 |
| JP | 2014-107237 A | 6/2014 |
| WO | 2012/039497 A1 | 3/2012 |

* cited by examiner

ROLL ELECTRODE AND METHOD FOR MANUFACTURING ROLL ELECTRODE

CROSS-REFERENCE TO RELATED APPLICATIONS

This is a divisional application of U.S. patent application Ser. No. 15/744,093, filed Jan. 12, 2018, which is a U.S. National stage application of International Application No. PCT/JP2015/070333, filed Jul. 15, 2015. The entire disclosure of U.S. patent application Ser. No. 15/744,093 is incorporated herein by reference.

BACKGROUND

Field of the Invention

The present invention relates to a roll electrode and a method for manufacturing a roll electrode.

Background Information

In recent years, in the automobile industry, advanced electronics industry, and the like, the demand for automobile batteries and batteries for electronic devices is increasing, and there are demands particularly for a reduction in size and thickness, higher capacities, and the like. Of the above, nonaqueous electrolyte secondary batteries, which have higher energy densities compared to other batteries, are attracting attention.

The manufacturing steps of such nonaqueous electrolyte secondary batteries include a step to form a roll electrode by winding an electrode around the outer circumference of a core that has a substantially circular outer circumference into a roll shape. A roll electrode is subjected to heat treatment to remove moisture and the like contained therein, and then cut into the required length (for example, see Japanese Laid Open Patent Application No. 2014-107237, which is referred to hereinafter as Patent Document 1).

Japanese Laid Open Patent Application No. 2006-44838 (referred to hereinafter as Patent Document 2) discloses a method of fixing an original printing plate at the start of winding to a hollow core using tape, in the field of roll-shaped original printing plates with a long original printing plate wound around a hollow core. It also discloses that the thickness of this tape is equal to or less than 0-20% of the thickness of the original printing plate. According to this roll-shaped original printing plate, it is possible to carry out winding without the stepped shape at the start of winding, which occurs near the hollow core, being transferred, and winding up can be carried out in a good state without generating loosening in the winding or tightening of the winding, to thereby improve the quality.

SUMMARY

Here, there are cases in which a roll electrode, such as that disclosed in Patent Document 1, is transported to the place where cutting is carried out after being subjected to heat treatment. The present inventors found a problem in that a phenomenon occurs in which, when transporting the roll electrode after carrying out the heat treatment described above, the electrode that is wound into a roll shape is shifted in the axial direction with respect to the core (so-called winding deviation). Furthermore, according to evaluations made by the present inventors, this problem occurs particularly when the expansion coefficient of the core that configures the roll electrode is higher than the expansion coefficient of the electrode. The cause of the problem was found to be that, when the heat treatment is applied, the electrode receives a compressive force from the core and a gap is generated after the heat treatment between the core and the electrode as well as between electrodes. Furthermore, it was found that generation of a winding deviation cannot be prevented, even if the end portion from which the electrode starts being wound around the core is fixed, as in the technique disclosed in Patent Document 2 described above.

The present invention was done to solve the problem described above, and an object thereof is to provide a means capable of suppressing the generation of winding deviation in a roll electrode in which the expansion coefficient of a core is higher than that of an electrode.

The roll electrode according to the present invention that achieves the object described above comprises a core that extends in the axial direction and has a substantially circular outer circumference, and an electrode that has an expansion coefficient that is lower than the expansion coefficient of the core and that is wound into a roll shape on the outer circumference of the core. Additionally, the roll electrode comprises a fixing part for fixing an end portion from which the electrode starts being wound around the core, and a regulating part for regulating the axial movement of the electrode wound into a roll shape with respect to the core. The regulating part is a ring plate disposed on both sides in the axial direction of the electrode that is wound into a roll shape, so as to be fixable to the outer circumference of the core. The outer circumference of the ring plate is configured to be on the inner circumferential side of the central portion between the outermost perimeter and the innermost perimeter of the electrode, which is arranged in a roll shape, as viewed from the axial direction.

In addition, in the method for manufacturing a roll electrode according to the present invention that achieves the object described above, a winding-start end portion of an electrode that has an expansion coefficient that is lower than the expansion coefficient of a core is fixed to the core, which extends in the axial direction and has a substantially circular outer circumference. Then, the electrode is wound into a roll shape around the outer circumference of the core up to the winding-finish end portion of the electrode. Then, a ring plate, the outer circumference of which is configured to be on the inner circumferential side of the central portion between the outermost perimeter and the innermost perimeter of the electrode, which is arranged in a roll shape, as viewed from the axial direction, is disposed and fixed on both sides in the axial direction of the electrode that is wound into a roll shape, on the outer circumference of the core.

In addition, in the method for manufacturing a roll electrode according to the present invention that achieves the object described above, a pair of ring plates, the outer circumferences of which are configured to be on the inner circumferential side of the central portion between the outermost perimeter and the innermost perimeter of the electrode, which is arranged in a roll shape, as viewed from the axial direction, are disposed and fixed on the outer circumference of a core that extends in the axial direction and has a substantially circular outer circumference, at a predetermined distance from each other in the axial direction. Then, a winding-start end portion of an electrode that has an expansion coefficient that is lower than the expansion coefficient of a core is fixed to the core between the pair of ring plates. Then, the electrode is wound into a roll shape around the outer circumference of the core up to the winding-finish end portion of the electrode.

The roll electrode configured as described above comprises a regulating part for regulating the axial movement of the electrode wound into a roll shape with respect to the core. Accordingly, it is possible to prevent a winding deviation, which occurs due to a gap being generated between the core and the electrode as well as between electrodes after the heat treatment, in a roll electrode in which the expansion coefficient of the core is higher than the expansion coefficient of the electrode.

Additionally, according to the method for manufacturing a roll electrode configured as described above, an intermediate portion between the winding-start end portion and the winding-finish end portion of an electrode is fixed to the core using tape. Accordingly, the fixing force of the electrode to the core is enhanced. Therefore, it is possible to suppress the generation of winding deviation in a roll electrode in which the expansion coefficient of a core is higher than the expansion coefficient of an electrode.

Furthermore, according to the method for manufacturing a roll electrode configured as described above, ring plates are disposed on both sides in the axial direction of the electrode that is wound into a roll shape. Accordingly, it is possible to suppress the generation of winding deviation in a roll electrode in which the expansion coefficient of a core is higher than the expansion coefficient of an electrode using the ring plates.

This disclosure addresses the above object as well as other objects, which will become apparent to those skilled in the art from this disclosure.

BRIEF DESCRIPTION OF THE DRAWINGS

Referring now to the drawings, a roll electrode is illustrated.

DETAILED DESCRIPTION OF THE EMBODIMENTS

Figure 1:
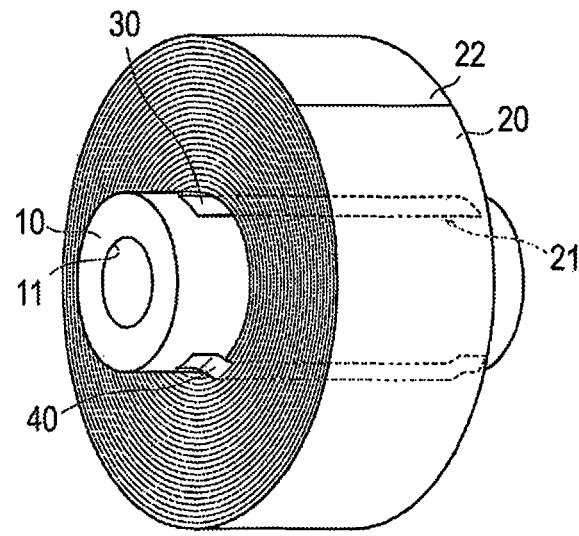
FIG. 1 is a perspective view illustrating a roll electrode according to the first embodiment.

The first embodiment according to the present invention will be described below, with reference to the appended drawings. In the explanations of the drawings, the same elements are given the same reference symbols, and overlapping explanations are omitted. The dimensional ratios in the drawings are exaggerated for convenience of explanation, and are different from the actual ratios.

First Embodiment

Figure 2:
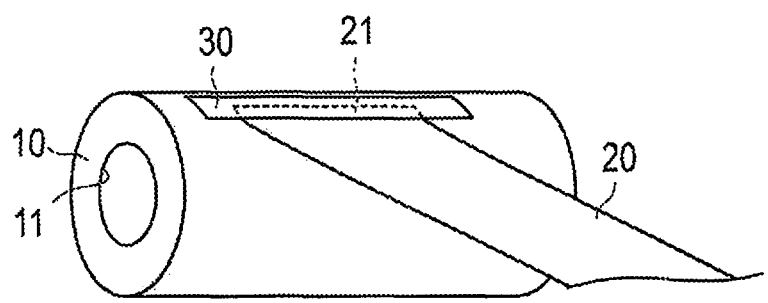
FIG. 2 is a perspective view illustrating a state in which a winding-start end portion of an electrode is fixed to a core using a first tape member.
Figure 3:
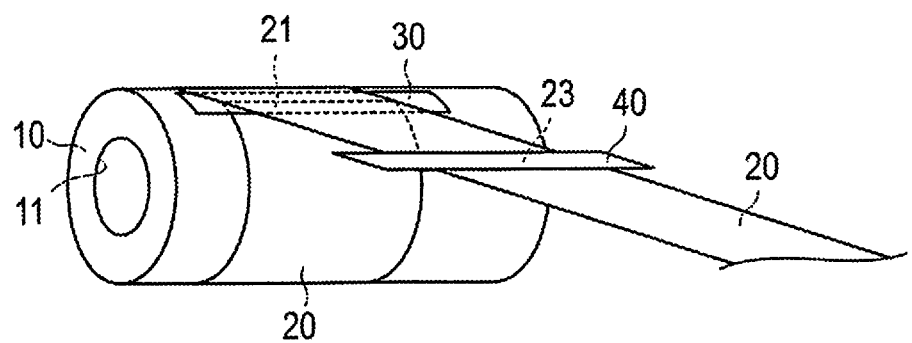
FIG. 3 is a perspective view illustrating a state in which an electrode has been wound around the core once.
Figure 4:
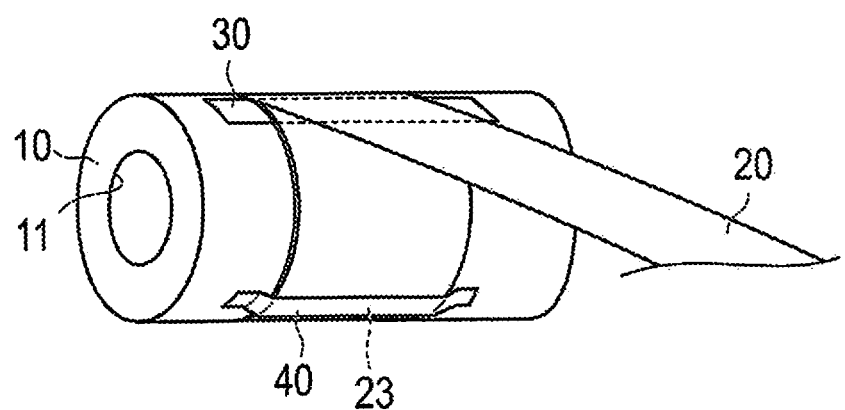
FIG. 4 is a perspective view illustrating a state in which an intermediate portion of an electrode is fixed to a core using a second tape member.

FIG. 1 is a perspective view illustrating a roll electrode according to the first embodiment. FIG. 2 is a perspective view illustrating a state in which a winding-start end portion of an electrode is fixed to a core using a first tape member. FIG. 3 is a perspective view illustrating a state in which an electrode has been wound around the core once. FIG. 4 is a perspective view illustrating a state in which an intermediate portion of an electrode is fixed to a core using a second tape member.

The roll electrode 1 according to the first embodiment comprises a cylindrical core 10 that extends in the axial direction (left/right direction in FIG. 1), and an electrode 20 that is wound into a roll shape on the outer circumference of the core 10, as illustrated in FIGS. 1-4. The roll electrode 1 further comprises a first tape member (corresponding to the fixing part) 30 that fixes a winding-start end portion 21 of the electrode 20 to the core 10, and a second tape member (corresponding to the regulating part) 40 that fixes an intermediate portion 23 of the electrode 20 to the core 10.

The core 10 has a through-hole 11 that extends therethrough in the axial direction, as illustrated in FIG. 1. A rotatable winding shaft (not shown) is inserted in the through-hole 11 when winding the electrode 20 around the core 10. The core 10 is not limited as long as the outer circumference is substantially circular, and may have a columnar shape or the like.

The material that constitutes the core 10 is, for example, aluminum. However, the material is not limited thereto, and may be another metal material as long as the metal has a higher thermal expansion coefficient than the thermal expansion coefficient of the electrode 20.

The electrode 20 comprises a current collector and an active material layer. An example of a method for layering an active material layer on the current collector is a method to coat, and dry, an electrode slurry on the current collector, but no limitation is imposed thereby. The electrode 20 may be configured such that an active material layer is layered on both sides of the current collector, or such that an active material layer is layered on one side of the current collector.

The electrode 20 comprises a negative electrode and a positive electrode.

A member that is conventionally used as a battery current collector may be appropriately employed as the material constituting the negative electrode current collector. Examples include aluminum, nickel, iron, stainless steel (SUS), titanium, and copper. Of the above, copper is preferable as a negative electrode current collector from the point of view of electron conductivity and battery operating potential. The thickness of the negative electrode current collector is not particularly limited, and is set giving consideration to the intended use of the battery.

The negative electrode active material layer is, for example, hard carbon (non-graphitizable carbon material). However, no limitation is imposed thereby, and it is also possible to use a graphite carbon material or a lithium-transition metal composite oxide. In particular, a negative electrode active material comprising carbon and lithium-transition metal composite oxide is favorable from the point of view of capacity and output characteristics.

The same material constituting the negative electrode current collector may be used as the material constituting the positive electrode current collector. Of the above, aluminum is preferable as a positive electrode current collector from the point of view of electron conductivity and battery operating potential. However, no limitation is imposed thereby, and it is also possible to use an aluminum foil, a clad material of nickel and aluminum, a clad material of copper and aluminum, or plating material of a combination of these metals. The thickness of the positive electrode current collector is not particularly limited, and is set giving consideration to the intended use of the battery.

An example of a material constituting the positive electrode active material layer is $LiMn_2O_4$. However, no particular limitation is imposed thereby. It is preferable to apply lithium-transition metal composite oxide, from the point of view of capacity and output characteristics.

In the present invention, it is necessary for the combination of the current collector and the active material layer of the electrode 20 to be a combination in which a gap is generated between the core 10 and the electrode 20 after heat treatment, as described later. That is, it is necessary for the combination to have, as the electrode 20 as a whole, a lower thermal expansion coefficient than the thermal expansion coefficient of the core 10.

The first tape member 30 fixes the winding-start end portion 21 of the electrode 20 to the core 10, as illustrated in FIG. 2. The first tape member 30 is attached across the entire region in the axial direction of the winding-start end portion 21 of the electrode 20. The winding-start end portion 21 is the position from which the electrode 20 starts being wound around the core 10.

The first tape member 30 has adhesiveness on the lower surface side in FIG. 2.

For example, a tape that uses an acrylic adhesive may be used as the first tape member 30, but no limitation is imposed thereby, and any tape member that is capable of fixing the winding-start end portion 21 of the electrode 20 to the core 10 may be used.

The second tape member 40 fixes an intermediate portion 23 between the winding-start end portion 21 and the winding-finish end portion 22 of the electrode 20 to the core 10, as illustrated in FIGS. 3, 4. The winding-finish end portion 22 is the position where the electrode 20 is finished being wound around the core 10 (refer to FIG. 1).

The second tape member 40 has adhesiveness on the lower surface side in FIG. 3.

In the present embodiment, the intermediate portion 23 is located in a winding region of the electrode 20 that is wound around the core 10 during the second turn, as illustrated in FIGS. 3, 4. That is, the second tape member 40 is attached to the outer circumference of the winding region of the electrode 20 that is wound around the core 10 during the second turn, and fixes the intermediate portion 23 to the core 10.

Meanwhile, due to thermal expansion of the core 10 and the electrode 20 using a heat treatment for removing moisture, and the like, the core 10 presses the electrode 20 radially outward. Consequently, the surface roughness of the winding region of the electrode 20 that is wound around the core 10 during the first turn is particularly reduced. If the second tape member 40 is attached to the winding region of the first turn, where the surface roughness has been reduced, the adhesive force of the second tape member 40 with respect to the winding region of the electrode 20 that is wound around the core 10 during the first turn is reduced, and the effect to suppress winding deviation is decreased. Therefore, it is preferable for the second tape member 40 to avoid the winding region of the electrode 20 that is wound around the core 10 during the first turn, and to be attached to the winding region that is wound around during the second turn or later. However, the present invention includes a mode in which the second tape member 40 is attached to the winding region of the electrode 20 that is wound around the core 10 during the first turn.

The second tape member 40 is attached to the intermediate portion 23 of the electrode 20 across the entire region in the axial direction, as illustrated in FIG. 4.

The second tape member 40 is disposed in a different position in the circumferential direction with respect to the first tape member 30 when viewed from the axial direction, as illustrated in FIG. 4. By disposing the second tape member 40 in this manner, compared to when being disposed in the same position in the circumferential direction, the height of the step that is generated radially outward, caused by the thicknesses of the first tape member 30 and the second tape member 40, can be reduced. Therefore, it is possible to suppress the occurrence of loosening in the winding or tightening of the winding, when winding the electrode 20 around the core 10. The second tape member 40 may be disposed in the same position in the circumferential direction, with respect to the first tape member 30.

The same material that constitutes the first tape member 30 may be used as the material constituting the second tape member 40.

Next, the method for manufacturing a roll electrode 1 according to the first embodiment will be described.

First, the winding-start end portion 21 of the electrode 20 is fixed to the core 10 by the first tape member 30, as illustrated in FIG. 2.

Next, the electrode 20 is wound into a roll shape around the outer circumference of the core 10, up to the intermediate portion 23 between the winding-start end portion 21 and the winding-finish end portion 22.

Next, the intermediate portion 23 is fixed to the core 10 by the second tape member 40, as illustrated in FIG. 4.

Then, the electrode 20 is wound into a roll shape around the outer circumference of the core 10 up to the winding-finish end portion 22 (refer to FIG. 1).

Figure 5A:
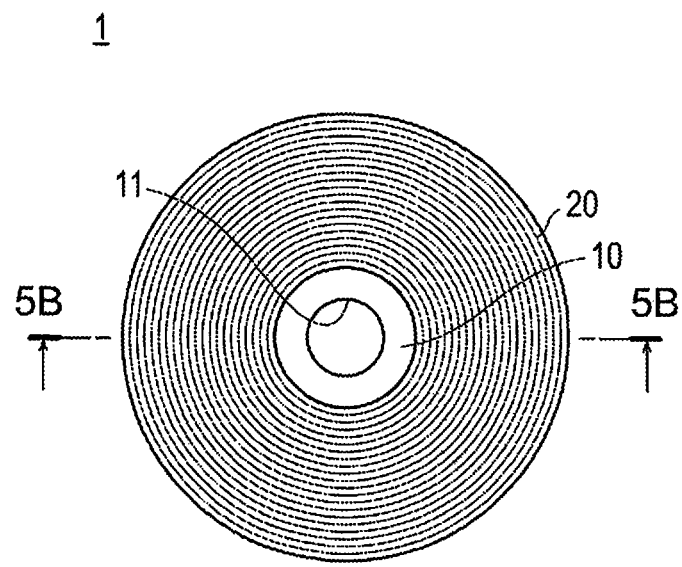
FIG. 5A is a side surface view illustrating a roll electrode before heat treatment.
Figure 5B:
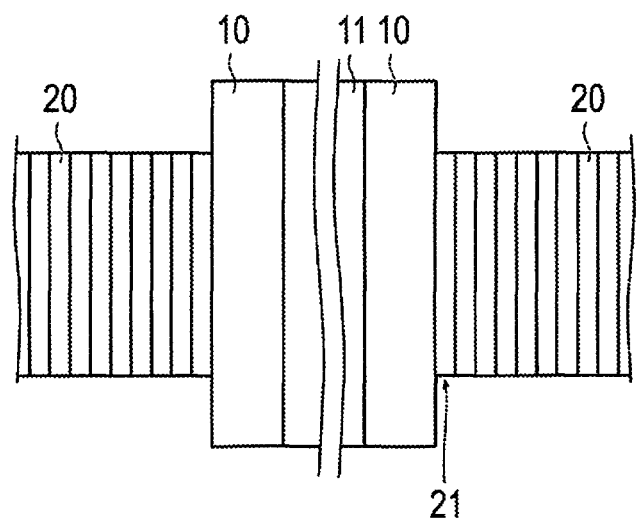
FIG. 5B is a schematic cross-sectional view illustrating the roll electrode before heat treatment as seen along section line 5B-5B in FIG. 5A.
Figure 6A:
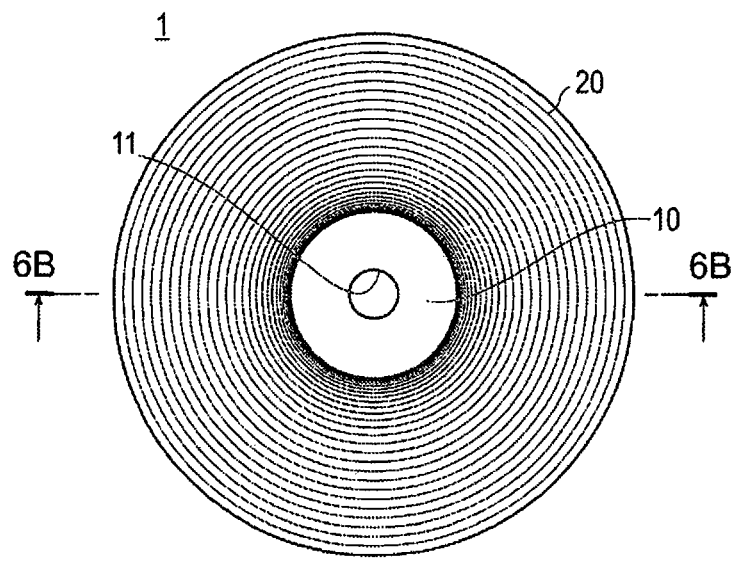
FIG. 6A is a side surface view illustrating a roll electrode immediately after heat treatment.
Figure 6B:
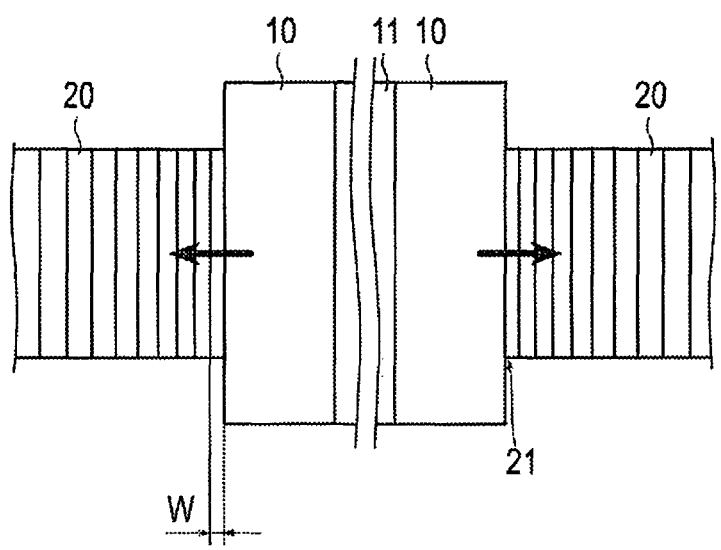
FIG. 6B is a schematic cross-sectional view illustrating the roll electrode immediately after heat treatment as seen along section line 6B-6B in FIG. 6A.
Figure 7A:
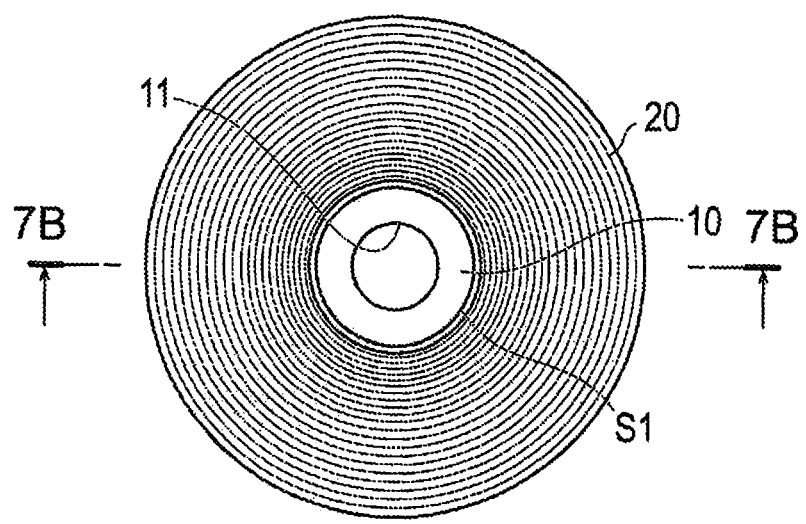
FIG. 7A is a side surface view illustrating a roll electrode when the temperature has returned to the atmospheric temperature after heat treatment.
Figure 7B:
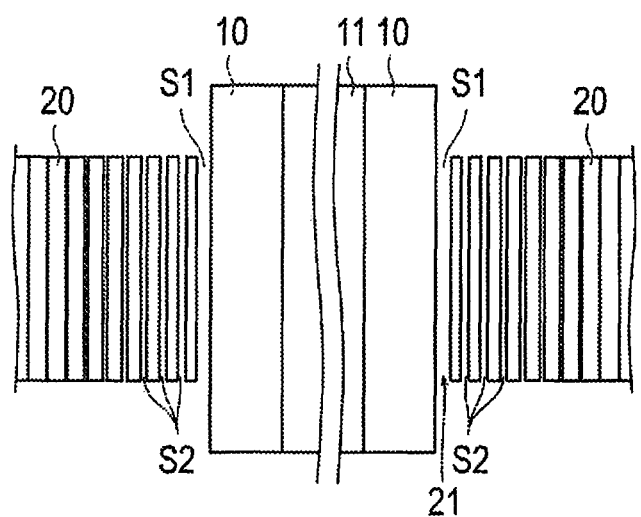
FIG. 7B is a schematic cross-sectional view the roll electrode when the temperature has returned to the atmospheric temperature after heat treatment as seen along section line 7B-7B in FIG. 7A.
Figure 8:
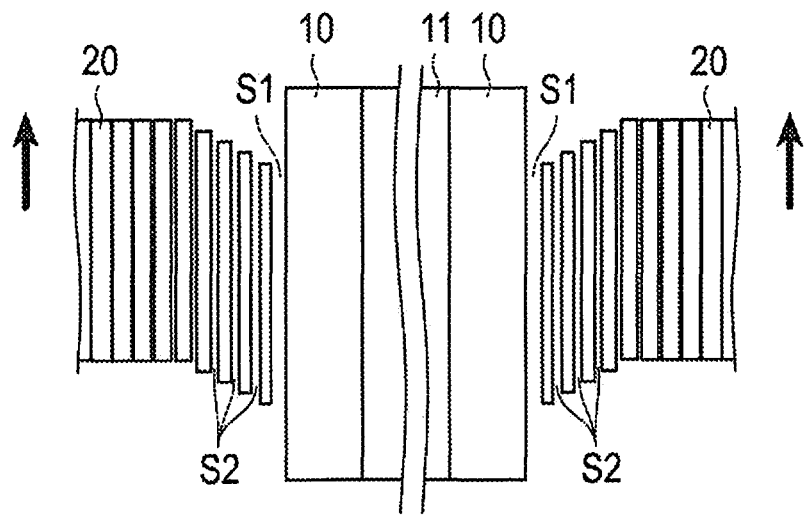
FIG. 8 is a schematic view illustrating the state of a winding deviation.
Figure 9:
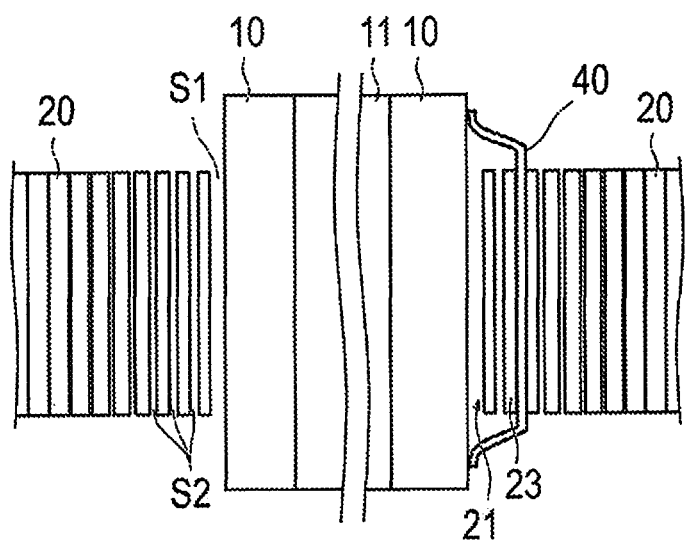
FIG. 9 is a view for explaining the effect of the roll electrode according to the present embodiment.

Next, the effect of the roll electrode 1 according to the first embodiment will be described, with reference to FIGS. 5A-9. FIGS. 5A-8 are views for explaining the mechanism by which a winding deviation occurs. Specifically, FIG. 5 is a view illustrating a roll electrode 1 before heat treatment;

FIG. 5A is a side surface view, and FIG. 5B is a schematic cross-sectional view taken along section line 5B-5B in FIG. 5A. FIG. 6 is a view illustrating a roll electrode 1 immediately after heat treatment; FIG. 6A is a side surface view, and FIG. 6B is a schematic cross-sectional view taken along section line 6B-6B in FIG. 6A. FIG. 7 is a view illustrating a roll electrode 1 when the temperature has returned to the atmospheric temperature after heat treatment; FIG. 7A is a side surface view, and FIG. 7B is a schematic cross-sectional view taken along section line 7B-7B in FIG. 7A. FIG. 8 is a schematic view illustrating the state of a winding deviation. FIG. 9 is a view for explaining the effect of the roll electrode 1 according to the present embodiment. In FIGS. 5-9, the first tape member 30 is omitted for ease of understanding. In addition, the hatching is omitted in FIGS. 5B, 6B, and 7B. Furthermore, a side surface view is as viewed from the axial direction.

First, the mechanism by which a winding deviation occurs will be described, with reference to FIGS. 5A-8.

Heat treatment is carried out for the purpose of removing moisture, and the like, present inside the roll electrode, with respect to a roll electrode in which an electrode 20 is wound around a core 10, as illustrated in FIGS. 5A and 5B. Heat treatment entails, for example, vacuum drying carried out for 24 hours at 150° C.

As a result, the core 10 and the electrode 20 are thermally expanded, as illustrated in FIG. 6A. More specifically, the core 10 expands so as to spread radially inward and radially outward. In addition, the electrode 20 expands so as to spread radially outward. Since the core 10 and the electrode 20 are thermally expanded in this manner, the electrode 20 receives a compressive force from the core 10 in the vicinity of the winding-start end portion 21 of the electrode 20 (refer to the arrow in FIG. 6B). As a result, the current collector of the electrode 20 is plastically deformed in the vicinity of the winding-start end portion 21, and the minute gap between the electrodes 20 that is generated when winding the electrode 20 around the core 10 is filled. Therefore, the thickness W of the electrode 20 decreases toward the inner circumferential side where the winding-start end portion 21 is located, as illustrated in FIG. 6B.

Then, when the temperature returns to atmospheric temperature after the heat treatment, the core 10 returns to the shape before the heat treatment, as illustrated in FIGS. 7A and 7B. In contrast, the current collector of the electrode 20 is plastically deformed at the time of the heat treatment, as described above, and the minute gap between the electrodes 20 that is generated when winding the electrode 20 around the core 10 is filled; therefore, the shape of the electrode does not return to the shape before the heat treatment, and becomes the shape illustrated in FIGS. 7A and 7B. Specifically, a gap S1 is formed between the core 10 and the electrode 20, and a gap S2 is also formed between the electrodes 20 in the vicinity of the winding-start end portion 21. The gap S2 is formed smaller than the gap S1, and is formed to become smaller from the inner circumferential side to the outer circumferential side of the core 10.

When a roll electrode, in which gaps S1 and S2 are formed in this manner, is transported, in the event a second tape member 40 is not provided as a comparative example, a winding deviation occurs, in which the electrode 20 moves in the axial direction with respect to the core 10, as illustrated in FIG. 8 (refer to the arrow in FIG. 8). The winding deviation occurs particularly on the inner circumferential side of the electrode 20 where the winding-start end portion 21 is located, as illustrated in FIG. 8.

In contrast, by fixing the intermediate portion 23 to the core 10 using the second tape member 40 as illustrated in FIG. 9, the fixing force of the electrode 20 to the core 10 is enhanced. Accordingly, it is possible to suppress an occurrence of winding deviation. As described above, since a winding deviation tends to occur on the inner circumferential side of the electrode 20, it is preferable for the second tape member 40 to be attached on the inner circumferential side of the electrode 20, which is wound into a roll shape.

As described above, the roll electrode 1 according to the first embodiment comprises a cylindrical core 10 that extends in the axial direction and an electrode 20 that has an thermal expansion coefficient that is lower than the thermal expansion coefficient of the core 10 and that is wound into a roll shape on the outer circumference of the core 10. The roll electrode 1 further comprises a first tape member 30 for fixing the winding-start end portion 21 of the electrode 20 to the core 10 and a second tape member 40 for regulating the axial movement of the electrode 20 wound into a roll shape with respect to the core 10. Accordingly, it is possible to suppress the generation of winding deviation in a roll electrode 1 in which the thermal expansion coefficient of the core 10 is higher than the thermal expansion coefficient of the electrode 20 by the second tape member 40.

In addition, the second tape member 40 is a tape member that fixes the intermediate portion 23 between the winding-start end portion 21 and the winding-finish end portion 22 of the electrode 20 to the core 10. Accordingly, the fixing force of the electrode 20 to the core 10 is enhanced by the second tape member 40. Therefore, it is possible to suppress an occurrence of winding deviation using an easy method to attach the second tape member 40 to the core 10 and the intermediate portion 23.

Therefore, the second tape member 40 fixes the intermediate portion 23 located in the winding region of the electrode 20 that is wound around the core 10 during the second turn to the core 10. Accordingly, the inner circumferential side of the electrode 20, where winding deviation particularly occurs, is fixed to the core 10 using the second tape member 40. Therefore, it is possible to favorably suppress an occurrence of winding deviation. Furthermore, since the second tape member 40 is attached while avoiding the winding region of the electrode during the first turn, where the surface roughness is reduced by the heat treatment, as described above, it is possible to more favorably suppress an occurrence of winding deviation.

In addition, the first tape member 30 and the second tape member 40 are disposed in different positions from each other in the circumferential direction when viewed from the axial direction. Accordingly, compared to when the first tape member 30 and the second tape member 40 are disposed in the same position in the circumferential direction, the height of the step that is generated radially outward, due to the thicknesses of the first tape member 30 and the second tape member 40, can be reduced. Therefore, it is possible to suppress the occurrence of loosening in the winding or tightening of the winding, when winding the electrode 20 around the core 10.

In addition, as described above, in the method for manufacturing a roll electrode 1 according to the first embodiment, the winding-start end portion 21 of the electrode 20, having a lower thermal expansion coefficient than the thermal expansion coefficient of the core 10, is fixed to the cylindrical core 10 that extends in the axial direction. Then, the electrode 20 is wound into a roll shape around the outer circumference of the core 10, up to the intermediate portion 23 between the winding-start end portion 21 and the winding-finish end portion 22. Then, the intermediate portion 23 is fixed to the core 10 using the second tape member 40, and the electrode 20 is wound into a roll shape around the outer circumference of the core 10 up to the winding-finish end portion 22. According to this manufacturing method, the intermediate portion 23 between the winding-start end portion 21 and the winding-finish end portion 22 is fixed to the core 10 using the second tape member 40. Accordingly, the fixing force of the electrode 20 to the core 10 is enhanced. Therefore, it is possible to suppress the generation of winding deviation in the roll electrode 1 in which the thermal expansion coefficient of the core 10 is higher than the thermal expansion coefficient of the electrode 20.

Next, modified examples of the roll electrode 1 according to the first embodiment will be described.

Modified Example 1

Figure 10:
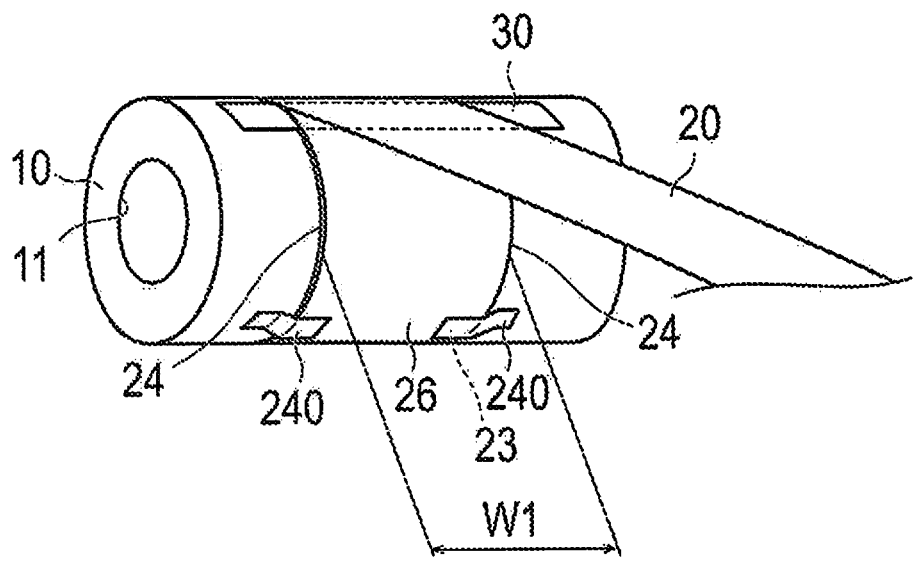
FIG. 10 is a perspective view illustrating a roll electrode according to the modified example 1.

FIG. 10 is a perspective view illustrating a roll electrode 2 according to the modified example 1. In the first embodiment described above, the second tape member 40 is attached to the intermediate portion 23 of the electrode 20 across the entire region in the axial direction. However, the second tape member 240 may be provided shorter than the width W1 of the electrode 20 along the axial direction, and at least an edge 24 of the electrode 20 along a direction intersecting the axial direction may be fixed to the core 10, as illustrated in FIG. 10. According to this configuration, it is possible to reduce the amount of the second tape member 240 that is used compared to the first embodiment; therefore, the roll electrode 2 can be manufactured at a low cost.

Furthermore, in the case of the second tape member 240 described above, the electrode 20 in the winding region of the third turn comes in contact with an exposed portion 26 where the electrode 20 is exposed, located between the second tape members 240. Accordingly, if the surface roughness of the electrode 20 is greater than that of the second tape member 240, the frictional force between the winding region of the second turn and the winding region of the third turn of the electrode 20 is increased, compared to a configuration in which the second tape member 40 is attached to the intermediate portion 23 across the entire region in the axial direction. Therefore, it is possible to more favorably suppress an occurrence of winding deviation.

Modified Example 2

Figure 11:
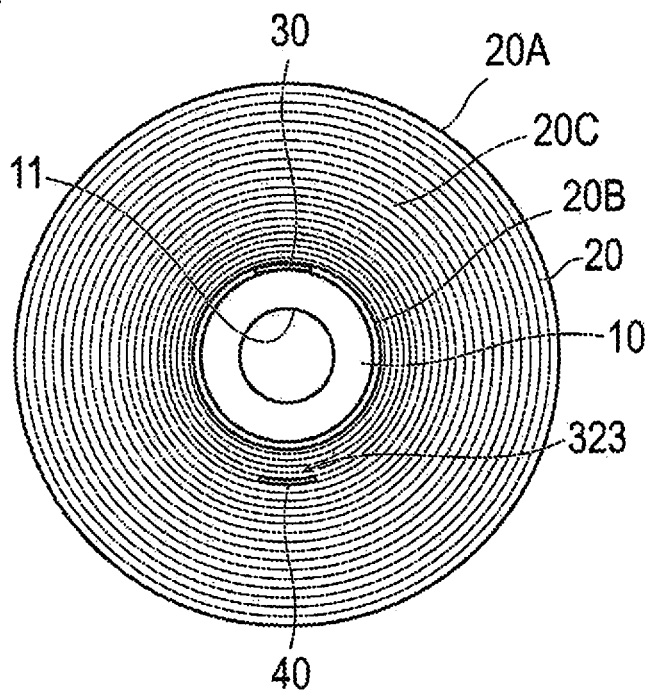
FIG. 11 is a perspective view illustrating a roll electrode according to the modified example 2.
Figure 12:
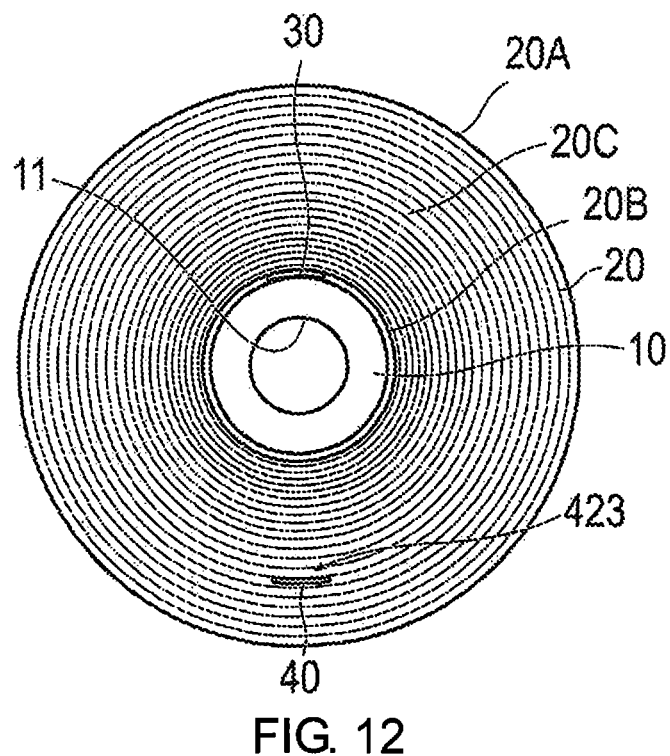
FIG. 12 is a schematic view illustrating a configuration in which the intermediate portion is located on the outer circumference side of the central portion.

FIG. 11 is a perspective view illustrating a roll electrode 3 according to the modified example 2. In the above-described first embodiment, the second tape member 40 fixes the intermediate portion 23 located in the winding region of the electrode 20 that is wound around the core 10 during the second turn to the core 10. However, the intermediate portion 323, which is fixed to the core 10, may be positioned on the inner circumferential side of the central portion 20C of the outermost perimeter 20A and the innermost perimeter 20B of the electrode 20, which is arranged in a roll shape, as viewed from the axial direction, as illustrated in FIG. 11. By fixing the intermediate portion 323, positioned on the inner circumferential side of the central portion 20C, to the core 10 using the second tape member 40, it is possible to fix the inner circumferential side of the electrode 20 where a winding deviation particularly occurs. An intermediate portion 423 that is fixed to the core 10 may be positioned on the outer circumferential side of the central portion 20C, as illustrated in FIG. 12.

Modified Example 3

In the first embodiment described above, a single-sided tape having adhesiveness on one side was used for the first tape member 30 and the second tape member 40. However, the first tape member 30 and the second tape member 40 may be a double-sided tape having adhesiveness on both sides.

Modified Example 4

In the first embodiment described above, the core 10 is configured from a metal material having a higher thermal expansion coefficient than the core 20, such as aluminum. However, the core may be a paper tube. A paper tube expands and contracts due to absorption of moisture. Therefore, since winding deviation occurs with transportation even if the core is a paper tube, it is possible to suppress an occurrence of winding deviation by fixing the intermediate portion 23 of the electrode 20 to the core using the second tape member 40. Therefore, in the present invention, the concept of the expansion coefficient includes the concepts of both a thermal expansion coefficient due to heat treatment and an expansion coefficient due to absorption of moisture.

Examples

The first embodiment of the present invention is explained in further detail below with examples, but the present invention is not limited only to these examples.

First, the method of forming the electrode 20 is described. Here, particularly the negative electrode of the electrode 20 will be described as an example. First, a negative electrode slurry was prepared by dispersing massive artificial graphite (MAGD manufactured by Hitachi Chemical Co., Ltd.): PVdF (polyvinylidene fluoride, binder) in NMP (N-methylpyrrolidone) at a composition ratio of 92:8. Thereafter, the negative electrode slurry was coated onto the surface of a Cu foil having a thickness of 10 μm using a die coater, and a negative electrode was prepared by float drying at 80° C. Thereafter, pressing was carried out to pack the negative electrode to a density of 1.4 g/cc. The thickness of the electrode 20 was 130 μm.

Next, the electrode 20 was wound around the core 10 to produce a roll electrode 1. The winding length per one electrode was set to 900 m. The outer diameter of the core was 160 mm.

Examples 1-3 and comparative examples 1-2 will be described below.

Example 1

Aluminum was used as the material of the core. In addition, the fixing method illustrated in FIG. 1 and described in the first embodiment was used as the fixing method. The second tape member 40 was fixed in a position separated from the first tape member 30 by 10 m.

Example 2

Aluminum was used as the material of the core. In addition, the fixing method illustrated in FIG. 10 and described in Modified Example 1 was used as the fixing method. The second tape member 240 was fixed in a position separated from the first fixing portion by 10 m.

Example 3

A paper tube was used as the material of the core. In addition, the fixing method illustrated in FIG. 1 and described in the first embodiment was used as the fixing method.

Comparative Example 1

Aluminum was used as the material of the core. In addition, only the first tape member 30 was used and a second tape member 40 was not used as the fixing method.

Comparative Example 2

A paper tube was used as the material of the core. In addition, only the first tape member 30 was used and a second tape member 40 was not used as the fixing method.

Next, the roll electrodes according to Examples 1-3 and Comparative Examples 1-2 were subjected to a thermohygrostat bath test or a heat treatment test. Each of the test methods will be described below.

The thermohygrostat bath test will be described. Specifically, roll electrodes were placed in a thermohygrostat bath to carry out a heat cycle test. The conditions were as follows.

(i) Temperature 25° C., humidity 50% for 24 hours
(ii) Temperature 60° C., humidity 50% for 24 hours
(iii) Temperature 25° C., humidity 10% for 24 hours
(iv) Temperature 25° C., humidity 50% for 24 hours Twenty sets of the cycle (i)-(iv) above were carried out.

The heat treatment test will be described. Specifically, roll electrodes were placed in a vacuum drying furnace to carry out vacuum drying for 24 hours at a temperature of 150° C.

Next, a load test was carried out on the roll electrode subjected to the thermohygrostat bath test or the heat treatment test. Specifically, roll electrodes were placed in a transport case, and a stop/go test was carried out using a forklift. The conditions were as follows.

Speed: 10 km/h, number of stop/go: three, load direction: axial direction

Next, the method of evaluating the winding deviation amount will be described.

Figure 13:
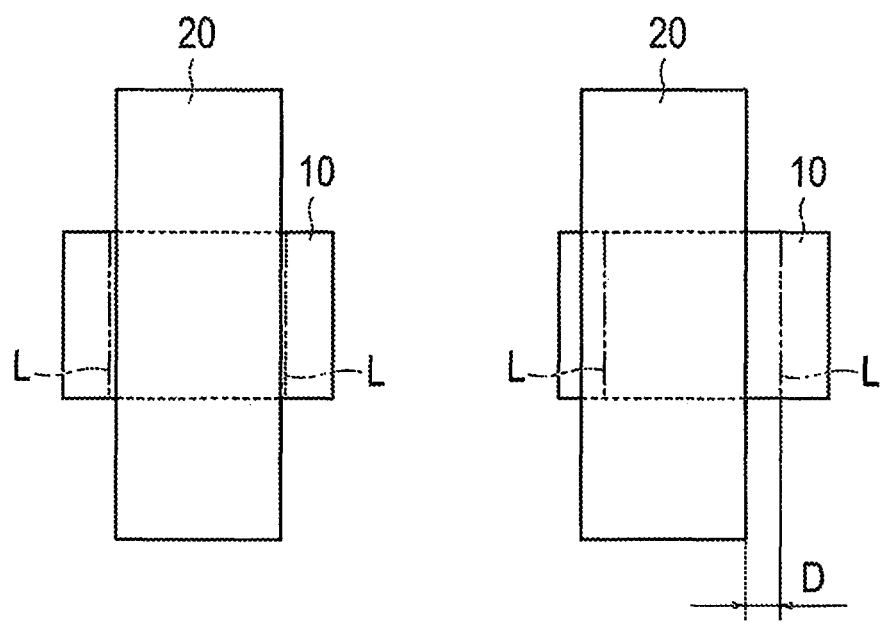
FIG. 13 is a view for explaining the method of measuring the winding deviation amount.

A score line L was drawn, and the winding deviation amount D after the above-described load test was measured, as illustrated in FIG. 13.

The evaluation results of the winding deviation amount of Examples 1-3 and Comparative Examples 1-2 are shown together in Table 1.

TABLE 1

|  | Thermohygrostat bath test | Heat treatment test |
| --- | --- | --- |
| Example 1 | 2 mm | 1.5 mm |
| Example 2 | 0 mm | 0 mm |
| Example 3 | 1.5 mm | 1 mm |
| Comparative Example 1 | 3 mm | 20 mm |
| Comparative Example 2 | 22 mm | 16 mm |

Comparison Results

From the results of Examples 1, 2 and Comparative Example 1, it was confirmed that generation of winding deviation that occurs when transporting a roll electrode could be suppressed using the first embodiment and modified example 1 of the present invention.

In addition, by comparing Example 1 according to the first embodiment and Example 2 according to Modified Example 1, it can be seen that generation of winding deviation can be more favorably suppressed using Example 2 according to Modified Example 1. This is because, as described above, if the surface roughness of the electrode 20 is greater than that of the second tape member 240, the frictional force between the winding region of the second turn and the winding region of the third turn of the electrode 20 is increased, by an exposed portion 26 where the electrode 20 is exposed being provided between the second tape members 240.

In addition, from the results of comparative example 2 and Example 3, it was confirmed that generation of winding deviation can be suppressed even if a paper tube is used as the core material instead of aluminum. This is because a paper tube expands and contracts by absorbing moisture, and demonstrates that the present invention is effective not only with respect to thermal expansion, but is effective in cases where there is a difference between the expansion/contraction ratios of the core and the electrode due to any physical factor, such as moisture and heat.

Second Embodiment

Next, the second embodiment of the present invention will be described. Descriptions of portions shared with the first embodiment will be omitted, and portions characteristic only to the second embodiment will be described. The roll electrode 4 according to the second embodiment is different from the roll electrode 1 according to the first embodiment in the means for suppressing generation of winding deviation.

Figure 14:
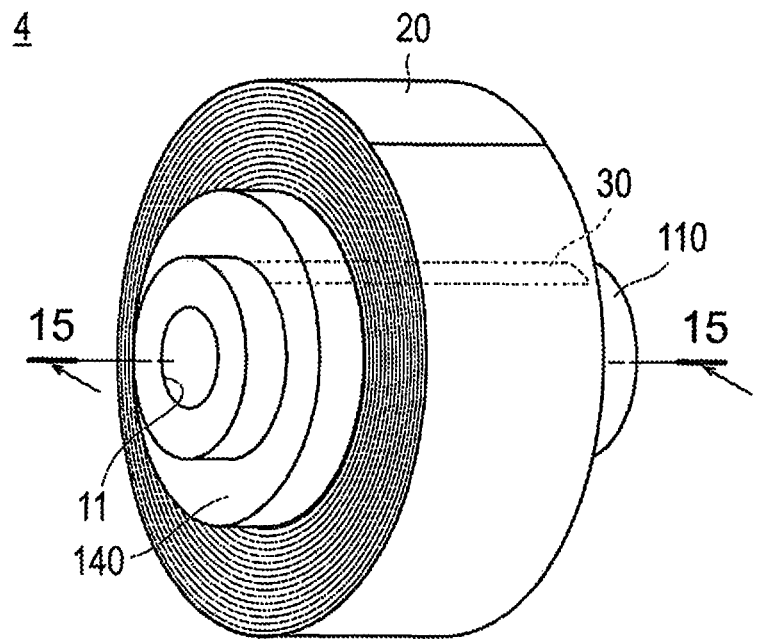
FIG. 14 is a perspective view illustrating a roll electrode according to the second embodiment.
Figure 15:
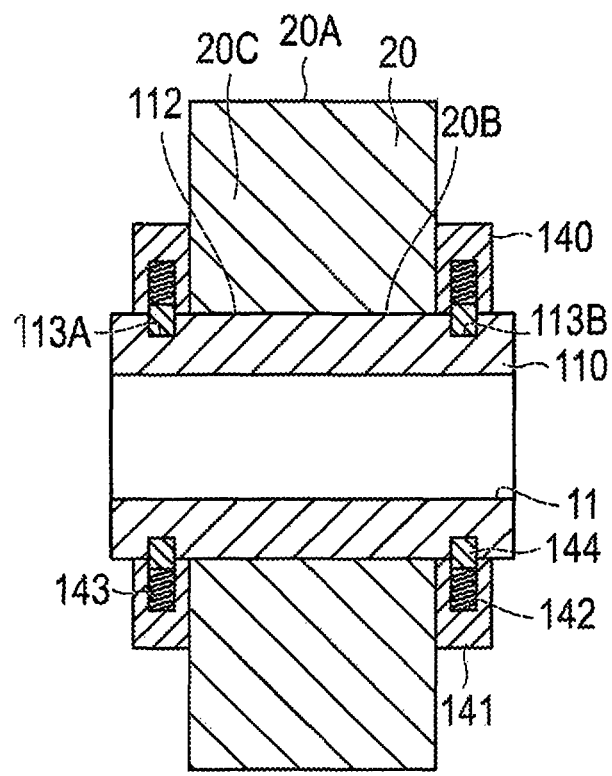
FIG. 15 is a cross-sectional view of the roll electrode as seen along section line 15-15 of FIG. 14.

FIG. 14 is a perspective view illustrating a roll electrode 4 according to the second embodiment. FIG. 15 is a cross-sectional view taken along the 15-15 line of FIG. 14.

The roll electrode 4 according to the second embodiment comprises a core 110, an electrode 20, a first tape member 30, and a ring plate (corresponding to the regulating part) 140, as illustrated in FIG. 14. The configurations of the electrode 20 and the first tape member 30 are the same as the configuration of the roll electrode 1 according to the first embodiment, and thus descriptions thereof are omitted.

The core 110 comprises a through-hole 11 extending in the axial direction and two groove portions 113A, 113B provided to the outer perimeter portion 112, as illustrated in FIG. 15.

The two groove portions 113A, 113B are provided on both sides of the electrode 20 in the axial direction, as illustrated in FIG. 15. Protrusions 144 of the ring plate 140, described later, are fitted to the two groove portions 113A, 113B.

The ring plate 140 regulates the axial movement of the electrode 20 wound into a roll shape with respect to the core 10. Two ring plates 140 are disposed on both sides of the electrode 20 wound into a roll shape in the axial direction.

The ring plate 140 comprises a main body portion 141, a recess 142 provided on the inner circumferential side of the main body portion 141, an elastic member 143 disposed in the recess 142, and a protrusion 144 to which a radially inward biasing force is applied by the elastic member 143, as illustrated in FIG. 15.

The outer circumference of the main body portion 141 is configured to be on the inner circumferential side of the central portion 20C between the outermost perimeter 20A and the innermost perimeter 20B of the electrode 20, which is arranged in a roll shape, as viewed from the axial direction. The outer circumference of the main body portion 141 may be configured to exceed the central portion 20C to be on the outer circumferential side.

The elastic member 143 is fixed to the recess 142. The protrusion 144 is fixed to the elastic member 143. The respective fixing means are not particularly limited.

The protrusion 144 is imparted with a radially inward biasing force by the elastic member 143 and is fitted to the two groove portions 113A, 113B of the core 110. The ring plate 140 is thereby fixed to the outer circumference of the core 110.

According to a roll electrode 4 configured in this manner, ring plates 140 are disposed on both sides in the axial direction of the electrode 20 that is wound into a roll shape. Accordingly, it is possible to suppress the generation of winding deviation in the roll electrode 4 in which the expansion coefficient of the core 110 is higher than the expansion coefficient of the electrode 20 by the ring plates 140.

Next, the method for manufacturing a roll electrode 4 according to the second embodiment will be described.

First, the winding-start end portion 21 of the electrode 20 is fixed to the core 110 using the first tape member 30.

Then, the electrode 20 is wound into a roll shape around the outer circumference of the core 110 up to the winding-finish end portion 22 of the electrode 20.

Then, ring plates 140 are disposed and fixed on both sides in the axial direction of the electrode 20 that is wound into a roll shape, on the outer circumference of the core 110. At this time, the protrusion 144 of the ring plate 140 is imparted with a radially inward biasing force by the elastic member 143 and is fitted to the two groove portions 113A, 113B of the core 110.

The manufacturing method is not limited to the manufacturing method described above and may be a manufacturing method in which the electrode 20 is wound into a roll shape around the outer circumference of the core 110, after the ring plates 140 are disposed and fixed on the outer circumference of the core 110.

As described above, the ring plates 140 of the roll electrode 4 according to the second embodiment are fixably disposed on the outer circumference of the core 110, on both sides in the axial direction of the electrode 20, which is wound into a roll shape. Accordingly, it is possible to suppress the generation of winding deviation in the roll electrode 4 in which the thermal expansion coefficient of the core 110 is higher than the thermal expansion coefficient of the electrode 20 by the ring plates 140.

Additionally, the outer circumference of the ring plate 140 is configured to be on the inner circumferential side of the central portion 20C between the outermost perimeter 20A and the innermost perimeter 20B of the electrode 20, which is arranged in a roll shape, as viewed from the axial direction. Accordingly, it is possible to regulate the movement on the inner circumferential side, where winding deviation particularly occurs.

In addition, as described above, in the method for manufacturing a roll electrode 4 according to the second embodiment, the winding-start end portion 21 of the electrode 20, having a lower thermal expansion coefficient than the thermal expansion coefficient of the core 110, is fixed to the cylindrical core 110 that extends in the axial direction. Then, the electrode 20 is wound into a roll shape around the outer circumference of the core 110 up to the winding-finish end portion 22 of the electrode 20, and plates 140 are disposed and fixed on both sides in the axial direction of the electrode 20 that is wound into a roll shape, on the outer circumference of the core 110. Accordingly, it is possible to suppress the generation of winding deviation in the roll electrode 4 in which the thermal expansion coefficient of the core 110 is higher than the thermal expansion coefficient of the electrode 20 by the ring plates 140.

In addition, in the method for manufacturing the roll electrode 4 according to the second embodiment, a pair of ring plates 140 are disposed and fixed on the outer circumference of the cylindrical core 110 that extends in the axial direction, at a predetermined distance from each other in the axial direction. Then, the winding-start end portion 21 of the electrode 20, which has a lower thermal expansion coefficient than the thermal expansion coefficient of the core 110, is fixed to the core 110 between the pair of ring plates 140, and the electrode 20 is wound into a roll shape around the outer circumference of the core 110 up to the winding-finish end portion 22 of the electrode 20. Accordingly, it is possible to suppress the generation of winding deviation in the roll electrode 4 in which the thermal expansion coefficient of the core 110 is higher than the thermal expansion coefficient of the electrode 20 by the ring plates 140.

What is claimed:

1. A roll electrode comprising:
   a core extending in an axial direction and having an outer circumference that is substantially circular;
   an electrode having an expansion coefficient that is lower than an expansion coefficient of the core and being wound into a roll shape on the outer circumference of the core;
   a fixing part fixing an end portion from which the electrode starts being wound around the core; and
   a regulating part regulating the axial movement of the electrode wound into the roll shape with respect to the core,
   the regulating part being a pair of ring plates with one of the ring plates contacting a lateral side of the electrode in the axial direction so as to be fixable to the outer circumference of the core, and
   outer circumferences of the ring plates being configured to be on an inner circumferential side of a central portion radially between an outermost perimeter and an innermost perimeter of the electrode as viewed from the axial direction.

2. The roll electrode according to claim 1, wherein each of the ring plates comprises a protrusion which engages the outer circumference of the core to prevent relative rotation.

3. The roll electrode according to claim 2, wherein the ring plate further comprises an elastic member, and the protrusion is biased against the outer circumference of the core a by the elastic member.

4. A method for manufacturing a roll electrode, the method comprising:
   fixing a winding-start end portion of an electrode to a core in which the electrode has an expansion coefficient that is lower than the expansion coefficient of the core, which extends in an axial direction and has a substantially circular outer circumference;
   winding the electrode into a roll shape around the outer circumference of the core up to a winding-finish end portion of the electrode; and
   fixing a pair of ring plates with one of the ring plates contacting a lateral side in the axial direction of the electrode that is wound into a roll shape on the outer circumference of the core, outer circumferences of the ring plates being configured to be on an inner circumferential side of a central portion radially between an outermost perimeter and an innermost perimeter of the electrode, which is arranged in a roll shape, as viewed from the axial direction.

5. A method for manufacturing a roll electrode, the method comprising:
fixing a pair of ring plates so that each of the ring plates contacts a lateral side of the electrode at a predetermined distance from each other in an axial direction on an outer circumference of a core that extends in the axial direction and that has a substantially circular outer circumference, the outer circumferences of the ring plates being configured to be on an inner circumferential side of a central portion radially between an outermost perimeter and an innermost perimeter of the electrode, which is arranged in a roll shape, as viewed from the axial direction;
fixing a winding-start end portion of the electrode to the core between the ring plates, in which the electrode has a lower expansion coefficient than an expansion coefficient of the core; and
winding the electrode is wound into the roll shape around the outer circumference of the core up to a winding-finish end portion of the electrode.

* * * * *